Jan. 25, 1966    F. M. WILLIAMSON    3,231,234
METERING VALVE
Filed Feb. 11, 1963    2 Sheets-Sheet 2
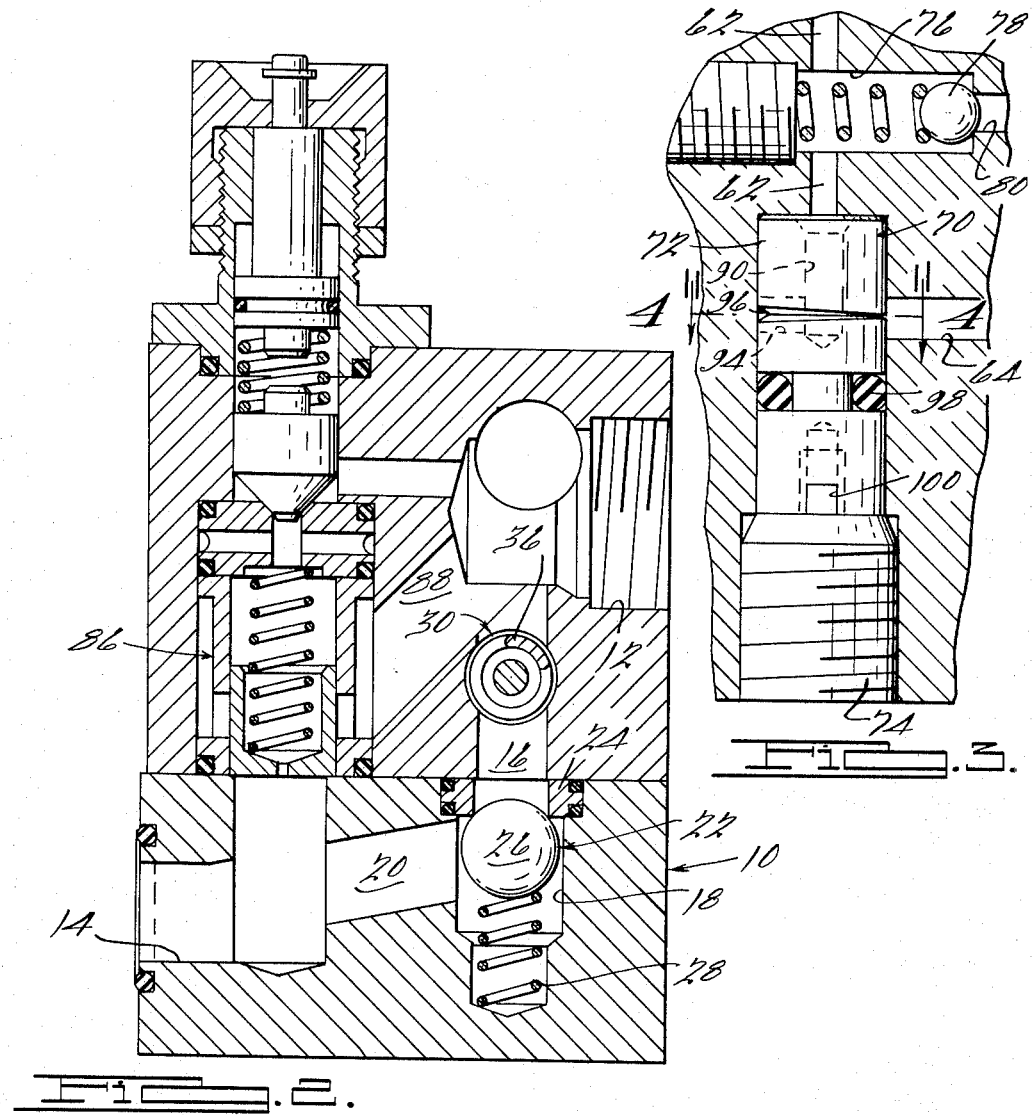
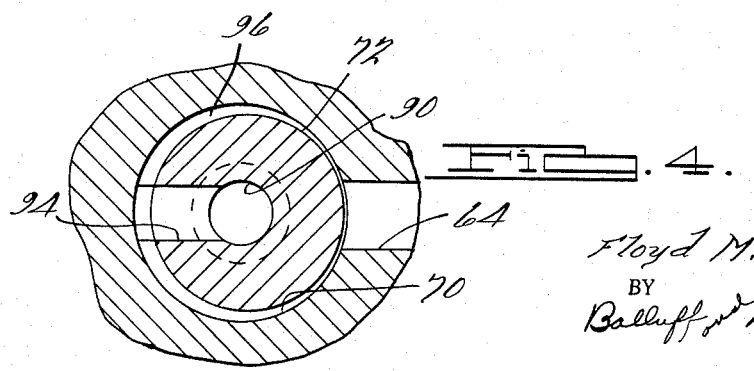
INVENTOR.
Floyd M. Williamson
BY
Balluff and McKinley
ATTORNEYS.

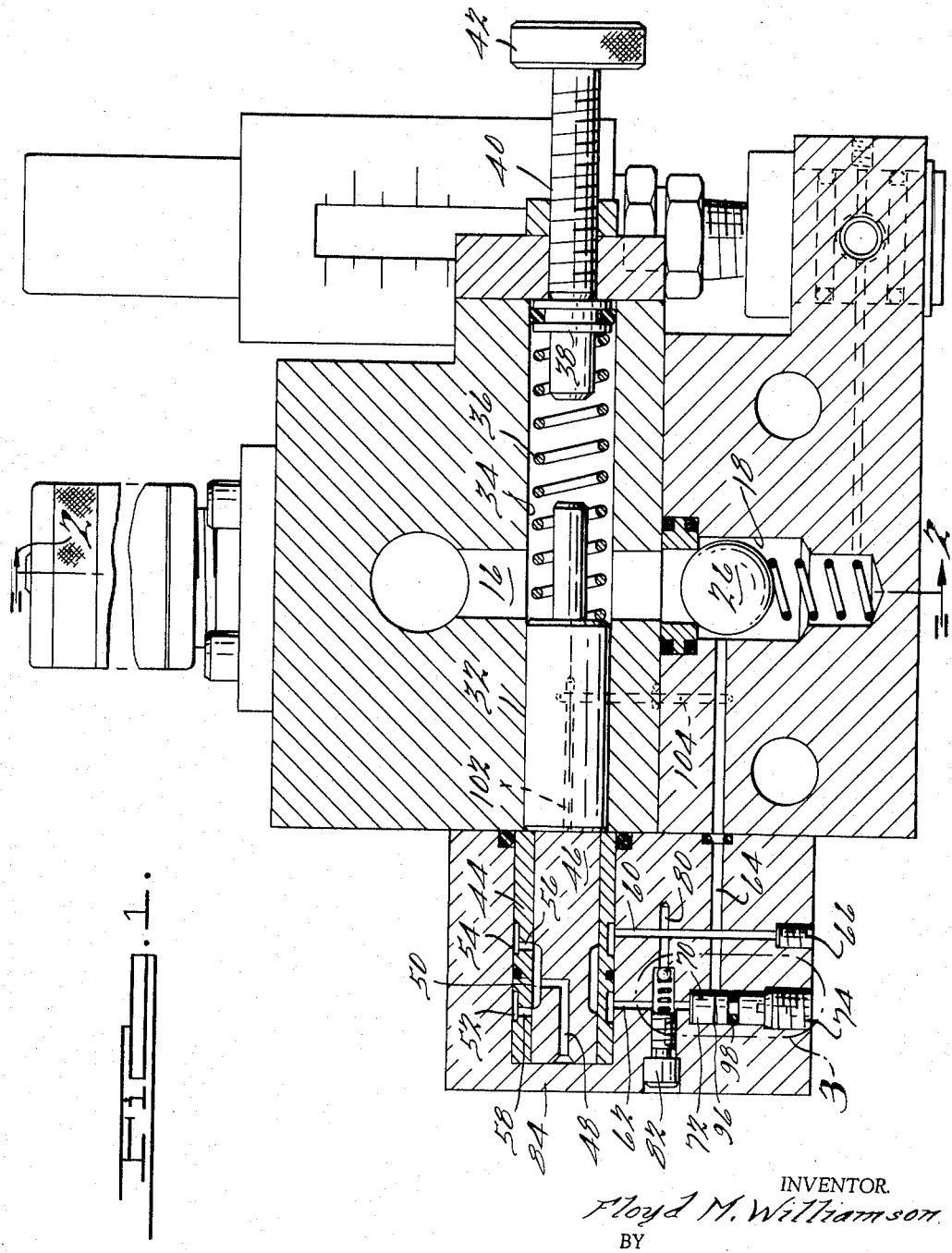

United States Patent Office 3,231,234
Patented Jan. 25, 1966

3,231,234
METERING VALVE
Floyd M. Williamson, Detroit, Mich., assignor to Di-Dro Engineering Company, Detroit, Mich., a corporation of Michigan
Filed Feb. 11, 1963, Ser. No. 257,595
3 Claims. (Cl. 251—209)

This invention relates to metering valves and has particular reference to a precision metering valve for closely and accurately regulating the flow of small amounts of hydraulic fluid. More particularly, the metering valve of my invention is adapted for use in control valves of hydraulic systems of the type disclosed in my prior copending applications Serial No. 36,929, now Patent No. 3,077,344, filed June 17, 1960, for "Control for Die Pads and Presses," and Serial No. 112,439, now Patent No. 3,147,723, filed May 24, 1961, for "Hydraulic Control System for Die Pads in Presses," the instant application being a continuation-in-part of such applications. Such hydraulic systems provide what is commonly referred to as a hydraulic cushion for the dies of a press.

In hydraulic systems of such type, it is important to accurately regulate and time the operation of certain control valves of the system, and for this purpose hydraulic metering valves are used. Needle type valves conventionally used are inadequate and unsatisfactory in many respects. The metering valve of the instant application makes it possible to accurately regulate the flow of a small amount of hydraulic fluid whereby the metering valve may be employed as an accurate timing means. The metering valve is particularly useful in hydraulic cushions for presses where a complete cycle of operations may be carried out in a second, and where accurate timing as close as one-fiftieth of a second may be required in order to achieve the desired operation of the system.

A principal object of the invention therefore is to provide a new and improved hydraulic metering valve which makes it possible to accurately regulate the flow of a small amount of hydraulic fluid under pressure and over a very short time interval.

Another object of the invention is to provide a metering valve construction which lends itself to the efficient production of uniform precision metering valves.

Another object of the invention is to provide a metering valve of this character which is constructed so that it is readily and precisely adjustable in fine increments.

Other and further objects of the invention will be apparent from the following description and claims and may be understood by reference to the accompanying drawings, of which there are two sheets, which by way of illustration show a preferred embodiment of the invention and what I now consider to be the best mode of applying the principles thereof. Other embodiments of the invention may be used without departing from the scope of the present invention as set forth in the appended claims.

In the drawings:

FIG. 1 is a sectional view of a control valve for a hydraulic system of the type referred to embodying the invention;

FIG. 2 is a sectional view taken generally along the line 2—2 of FIG. 1;

FIG. 3 is an enlarged fragmentary sectional view of the metering valve; and

FIG. 4 is a sectional view taken along the line 4—4 of FIG. 3.

As illustrated in FIGS. 1 and 2, the control valve forms a part of a hydraulic system for controlling the flow of hydraulic fluid between a reservoir or source (not shown) on the one hand, and a cylinder having a piston (not shown) which is arranged to react against a die or die pad of the press as disclosed, for example, in my application Serial No. 36,929. The control valve as illustrated in FIGS. 1 and 2 comprises in general a body 10 having a port 12 which is in communication by means of a hydraulic fluid pressure line with a reservoir of hydraulic fluid under regulated pressure and a port 14 which is connected by a hydraulic fluid pressure line to the cylinder against which the die or die pad of the press reacts. A fluid flow passage 16 communicates at one end with the port 12 and at its other end with a check valve chamber 18, and a passage 20 interconnects the check valve chamber 18 and the port 14 whereby hydraulic fluid under reservoir pressure supplied to the port 12 may flow through the passage 16, the check valve chamber 18, and the passage 20 to the port 14 and the cylinder associated with the die of the press. As the pressure in the line connected to the port 14 varies during the cycle of press operation, for convenience I refer to the passage 20 and the part of the system in open communication with port 14 as the variable pressure side of the control valve.

A check valve 22 is disposed in the chamber 18 and includes an annular seat 24, a ball check valve 26, and a spring 28 reacting against the ball valve 26 so as to urge the same toward its seat. However, when the pressure in passage 20 is less than in passage 16, and the delay valve 30 is open, the pressure differential will unseat the ball valve 26 and permit fluid flow from the passage 16 to the passage 20. The valve 30 as illustrated in FIG. 1 comprises a spool or piston valve member 32 which is reciprocable in a valve bore 34 and is biased to open position as shown in FIG. 1 by a coil spring 36, one end of which reacts against the valve member 32 and the other end of which reacts against an adjustable annular abutment 38 carried by threaded member 40 having a knurled head 42. The inner end of member 40 may be adjusted axially of the bore 34 for locking valve member 32 in its normally open position as illustrated in FIG. 1.

A cylindrical sleeve 44 is fixed in a cavity in line with the bore 34 and forms a cylinder for a piston 46 which is disposed so as to react against the valve member 32. The piston 46 is provided with a passage 48 which extends between one end of the piston and an annular groove 50 in the periphery of the piston. The sleeve 44 is provided with spaced annular grooves 52 and 54, and a radially extending passage 56 extends between the groove 54 and the bore of the cylinder 44, and a passage 58 extends between the annular groove 52 and the bore of the cylinder 44. In the retracted position of the piston 46 as shown, the groove 50 therein is in full communication with the passage 56 and partial communication with the passage 58. Parallel passages 60 and 62 communicate with the annular grooves 52 and 54 in the outer periphery of the cylinder 44. The passage 60 intersects a passage 64 which at one end is in continuous open communication with the check valve chamber 18 and the variable pressure side of the control valve. The outer end of the passage 60 is closed by a plug 66. The passage 62 opens into a cylindrical valve bore 70 in which cylindrical metering plug 72 is disposed with a frictional fit which prevents accidental rotation thereof. A threaded plug 74 threaded into the exposed end of the bore 70 serves to fix the plug 72 against movement. The other end of the passage 64 opens into the side wall of the bore 70. The passage 62 intersects a check valve chamber 76 having a ball check valve 78 therein which normally closes the end of a cross passage 80 which intersects the passage 60. The outer end of the check valve chamber 76 is closed by a plug 82. It will be understood that the valve passages and chambers are normally charged with hydraulic fluid such as oil under pressure from the source because of the fact that the check valve chamber 18 is normally supplied with hydraulic fluid from the source.

Thus, hydraulic fluid will flow from check valve chamber 18 through the passage 64, the passage 60, the passage 80, past the check valve 78, through the check valve chamber 76 and the passage 62 to the grooves 52 and 54, and thence through the passages 56 and 58, the annular groove 50, and the passage 48. However, the pressure of the hydraulic fluid normally prevailing is insufficient to shift the piston 46 to the right against the force of the spring 36. When the ram of the press closes, it reacts on the piston in the cylinder associated with the die of the press and thereby substantially increases the pressure of the hydraulic fluid in such cylinder and in the passage 20 and the check valve chamber 18. This pressure is transmitted through the passages 64, etc. to react against the end of the piston 46 and the closed end 84 of the cylinder so as to shift the piston 46 to the right (to uncover passage 58) and thereby shift the valve member 32 to the right so as to close the delay valve 30 by reason of the fact that the valve member 32 obstructs the passage 16.

When the pressure of the hydraulic fluid in the passage 20 (due to the closing of the press ram) rises to a predetermined amount substantially above the pressure on the reservoir side of the control valve, it will open the pressure relief valve indicated generally at 86 and thus permit the return of hydraulic fluid from the variable pressure side of the control valve through the by-pass passage 88 to the inlet port 12, thus by-passing the check valve 26 and the delay valve 30 which is then closed. The valves 86, 26 and 30 (when closed) separate the variable pressure side of the hydraulic system from the reservoir side thereof.

The pressure relief valve 86 is essentially of the type disclosed in my prior Patent No. 2,901,238, issued August 25, 1959, for "Circulating System for Hydraulic Liquid Between Tanks and Cylinders." Suffice it to say here that the pressure relief valve 86 is normally closed, and opens momentarily during the closing of the press ram to permit the return of hydraulic fluid displaced from the hydraulic cushion cylinder through the by-pass 88. When the press ram opens, the pressure on the variable pressure side of the control valve falls, and since the valves 30 and 86 are then closed, hydraulic fluid cannot then flow back to the variable pressure side of the system, with the result that the die which is retracted upon the closing of the press ram will remain retracted until the valve 30 opens. In order to close the valve 30, the piston 46 must shift to the right to such an extent that the groove 50 in the piston is out of registry with both of the passages 56 and 58. Under such conditions hydraulic fluid is trapped in the cylinder 44 between the end of the piston 46 and the end wall 84 of the cylinder except for the relief afforded through the passage 58 which at such time is open.

Under the pressure of the spring 36 the piston 46 is biased to the left and hence tends to displace the trapped fluid from the cylinder 44. Flow of fluid through the passage 62, however, is regulated by the metering plug 72. As may be seen from FIGS. 3 and 4, the plug 72 has a close fit in the bore 70. The plug 72 is provided with an axially extending passage 90 which at one end communicates with the passage 62 and at its other end with a radially extending passage 94 which at its outer end communicates with an annular groove 96 formed in the outer periphery of the plug 72. The groove 96 tapers and is V-shaped in cross section so as to provide a fluid flow passage which varies in cross section throughout its length. The groove 96 is disposed in alignment with one end of the fluid flow passage 64 whereby the groove 96 forms a control passage or orifice for the flow of hydraulic fluid between the passage 94 and the passage 64.

In the position as shown in FIG. 4, the groove 96 provides a flow restriction between the passages 94 and 64 since the cross section of the groove 96 adjacent the passage 64 is of such minute size as to restrict the flow of hydraulic fluid under pressure through the groove 96 into the passage 64. The groove 96 may be made of varying depth and width and, if a very minute flow is desired, the depth of the groove 96 at its shallowest portion may be made as small as about .0005 inch or less, and its width may also be of the same order so that the cross section of the groove 96 at its smallest portion may be substantially less than .0005 of a square inch. If desired, the groove 96 may be made so as to taper out completely.

It will be evident that by turning the plug 72 in the bore 70, the effective cross section of the groove 96 between the passage 94 and the passage 64 may be very gradually varied within wide limits. If the passage 94 is brought into alignment with the passage 64, the passage 96 will be by-passed, whereas if the plug 72 is shifted 180° the flow through passage 96 will be at a minimum. The V-shape of groove 96 minimizes the possibility of plugging due to dirt in the hydraulic fluid.

The plug 72 is provided with an annular groove for accommodating the sealing ring 98, and the outer end of the plug 72 is provided with a slot 100 whereby the plug 72 may be rotated to a set position. The threaded plug 74 threaded in the outer threaded end of the bore 70 reacts against the outer end of the plug 72 for locking it in its adjusted position. The threaded plug 74 may have its exposed end formed to accommodate an Allen head wrench.

The valve member 32 is of greater cross section than the piston 46. The end of the bore 34 adjacent the end of the cylinder 44 is vented by a passage 102, 104 which communicates with the passage 64 so as to eliminate any tendency of the valve 32 to stick because of fluid being trapped in the end of the bore 34 adjacent the end of the cylinder 44.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A metering valve for use in a hydraulic press control system, said metering valve comprising a valve body member having a first and a second cylindrical passage extending thereinto in perpendicular directions toward intersection in a right angle and having a cylindrical bore of greater diameter than the passages extending from an outer end thereinto coaxially with the first of said passages from the exterior of the valve body member to a point at an inner end thereof beyond the second passage to form an enlarged valve chamber in communication with both of the passages, said bore having internal threads at the outer end thereof and providing an annular flat abutment at the inner end thereof extending perpendicularly to the longitudinal axis of the bore, concentric with the first passage and communicating axially therewith and valve means for bleeding hydraulic fluid between the first and second passages through the valve chamber comprising, a cylindrical valve member having an inner and outer end and a close slip-fit with said valve chamber positioned within the inner end of said valve chamber and having a flat inner end surface resting in sealing relation on said annular abutment formed at the inner end of the bore around the first passage, a passage extending axially into said valve member from the inner end thereof and concentric with said first passage in the valve body member and in open communication therewith, said valve member also having a radially extending passage therein extending from one outer surface thereof into communication with said axially extending passage, a V-shaped groove extending circumferentially around said cylindrical valve member, tapering gradually inwardly to the surface of the cylindrical member over substantially one hundred eighty degrees of the valve member in each direction from the radially extending passage therein and communicating therewith, the inner end of said bore being so related to the second passage in said body member and the V-shaped groove in the outer surface of the valve member being so related to the inner end of the valve member to place the V-shaped recess in position for communication with the second passage on rotation of the valve member, the communication between the V-shaped recess and the second passage being gradually increased on rotation of the valve member through approximately ninety degrees in either direction from the rotational position thereof wherein the radially extending passage in the valve member is axially aligned with and one hundred eighty degrees displaced from the said second passage, means at the outer end of the valve member for rotating the valve member against the friction due to the close slip-fit thereof within the valve chamber formed by the bore and a threaded plug screwed in the outer end of the bore and engaging said valve member for locking the valve member in a predetermined angularly adjusted position with the inner end thereof firmly engaged with the annular abutment provided at the inner end of the bore.

2. Structure as set forth in claim 1 and further including an annular recess about the valve member between the V-shaped groove therein and the said outer end thereof and an O-ring sealing member secured within the annular recess.

3. Structure as set forth in claim 1 wherein the means for rotating the valve member within the valve chamber comprises a transverse slot extending across a diameter of the outer end of the valve member for insertion of a screwdriver therein.

References Cited by the Examiner
UNITED STATES PATENTS

| | | | |
|---|---|---|---|
| 1,698,422 | 1/1929 | Aldrich | 251—209 XR |
| 2,424,328 | 7/1947 | Pars | 251—209 |
| 2,850,041 | 9/1958 | Radanof | 251—310 X |
| 2,861,769 | 11/1958 | Schumann | 251—209 XR |
| 2,901,238 | 8/1959 | Williamson | 267—1 |
| 2,924,446 | 2/1960 | Williamson | 267—1 |
| 3,045,697 | 7/1962 | Seguenot | 251—209 XR |
| 3,115,892 | 12/1963 | Brewer | 251—209 XR |

FOREIGN PATENTS

| | | |
|---|---|---|
| 1,253,916 | 1/1961 | France. |
| 1,033,980 | 7/1958 | Germany. |
| 21,477 | 1911 | Great Britain. |

M. CARY NELSON, *Primary Examiner.*

ISADOR WEIL, *Examiner.*